(12) United States Patent
Hoffmann

(10) Patent No.: US 10,431,111 B2
(45) Date of Patent: Oct. 1, 2019

(54) REMEDIAL HANDWRITING GLOVE

(71) Applicant: Justine Hoffmann, Smithtown, NY (US)

(72) Inventor: Justine Hoffmann, Smithtown, NY (US)

( * ) Notice: Subject to any disclaimer, the term of this patent is extended or adjusted under 35 U.S.C. 154(b) by 221 days.

(21) Appl. No.: 15/589,418

(22) Filed: May 8, 2017

(65) Prior Publication Data
US 2018/0322804 A1    Nov. 8, 2018

(51) Int. Cl.
*G09B 11/02* (2006.01)
*A41D 19/00* (2006.01)
*A41D 15/00* (2006.01)

(52) U.S. Cl.
CPC ............ *G09B 11/02* (2013.01); *A41D 15/005* (2013.01); *A41D 19/002* (2013.01); *A41D 19/0013* (2013.01); *A41D 19/0024* (2013.01); *A41D 2400/80* (2013.01)

(58) Field of Classification Search
USPC ......... 434/162, 166, 247, 258; 2/159, 161.1, 2/161.2, 161.3, 161.6; 401/6, 8, 48
See application file for complete search history.

(56) References Cited

U.S. PATENT DOCUMENTS

| | | | | |
|---|---|---|---|---|
| 1,247,183 A * | 11/1917 | Usterud | .............. | A41D 19/00 15/443 |
| 2,751,598 A * | 6/1956 | Romeo | .............. | A63B 71/146 2/161.3 |
| 4,665,565 A * | 5/1987 | Odom | .............. | A63B 71/146 2/159 |
| 4,684,123 A * | 8/1987 | Fabry | .............. | A63B 21/065 482/105 |
| 4,796,306 A * | 1/1989 | Mitchell | .............. | A63B 71/148 2/161.5 |
| 4,957,442 A * | 9/1990 | Prater | .............. | A61F 4/00 401/48 |
| 5,004,227 A * | 4/1991 | Hoffman | .............. | A63B 21/065 2/159 |
| 5,435,013 A * | 7/1995 | Davis | .............. | A63B 71/146 2/161.1 |
| 5,530,967 A * | 7/1996 | Cielo | .............. | A63B 71/143 2/16 |
| 5,722,575 A * | 3/1998 | Smith | .............. | A45F 5/00 15/443 |
| 5,802,615 A * | 9/1998 | Wenk | .............. | A63B 71/146 2/160 |
| 6,550,068 B1 * | 4/2003 | Materon | .............. | A41D 19/01594 2/160 |
| 6,564,385 B2 * | 5/2003 | McCarthy | .............. | A63B 21/4019 2/16 |
| 6,705,788 B2 * | 3/2004 | Gadberry | .............. | B43K 23/001 15/443 |
| 7,051,377 B1 * | 5/2006 | Milner | .............. | A41D 19/01547 2/159 |

(Continued)

*Primary Examiner* — Kurt Fernstrom
(74) *Attorney, Agent, or Firm* — Dunlap Bennett & Ludwig PLLC

(57) ABSTRACT

A remedial handwriting aid. The remedial handwriting aid includes a glove. The glove includes a first connector attached to a pinky sleeve and second connector attached to a ring finger sleeve. A third connector is attached to a palm portion of the glove. The first connector and the second connector releasably attach to the third connector.

10 Claims, 3 Drawing Sheets

(56) References Cited

U.S. PATENT DOCUMENTS

| | | | | |
|---|---|---|---|---|
| 7,371,026 B2* | 5/2008 | Berger | G09B 11/02 | |
| | | | | 401/8 |
| 7,661,150 B2* | 2/2010 | Hess | A41D 19/01582 | |
| | | | | 2/159 |
| 8,281,416 B1* | 10/2012 | Smith | A41D 19/01529 | |
| | | | | 2/161.6 |
| 8,591,235 B1* | 11/2013 | Berman | G09B 11/02 | |
| | | | | 434/166 |
| 9,968,506 B2* | 5/2018 | Cruz | A61H 1/0288 | |
| 2003/0089017 A1* | 5/2003 | Roush | A41D 19/0157 | |
| | | | | 42/94 |
| 2014/0322679 A1* | 10/2014 | Devine-Baillargeon | | |
| | | | G09B 11/00 | |
| | | | | 434/166 |

* cited by examiner

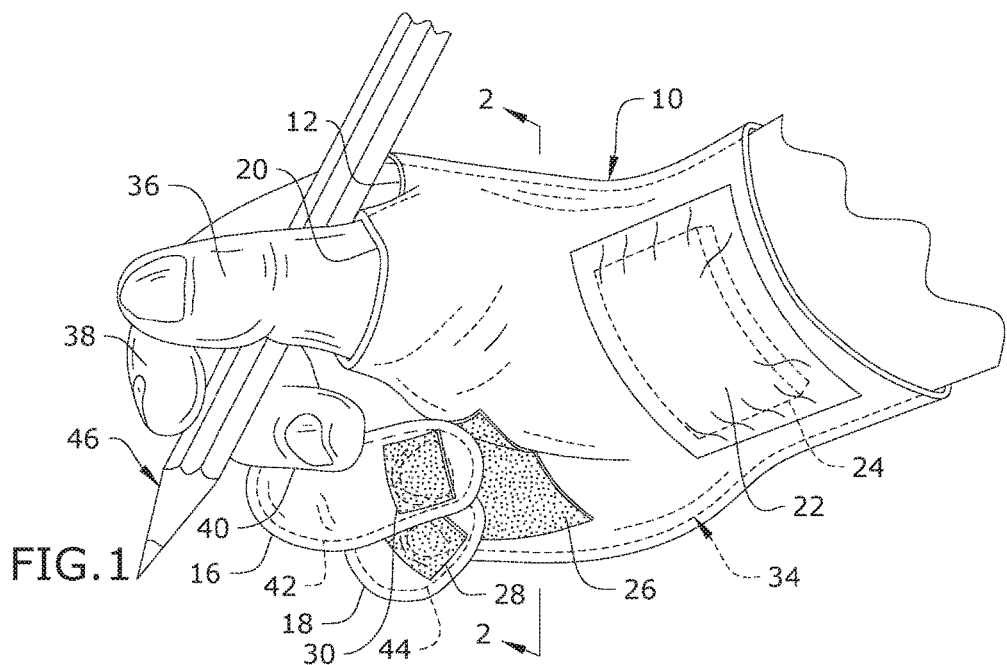
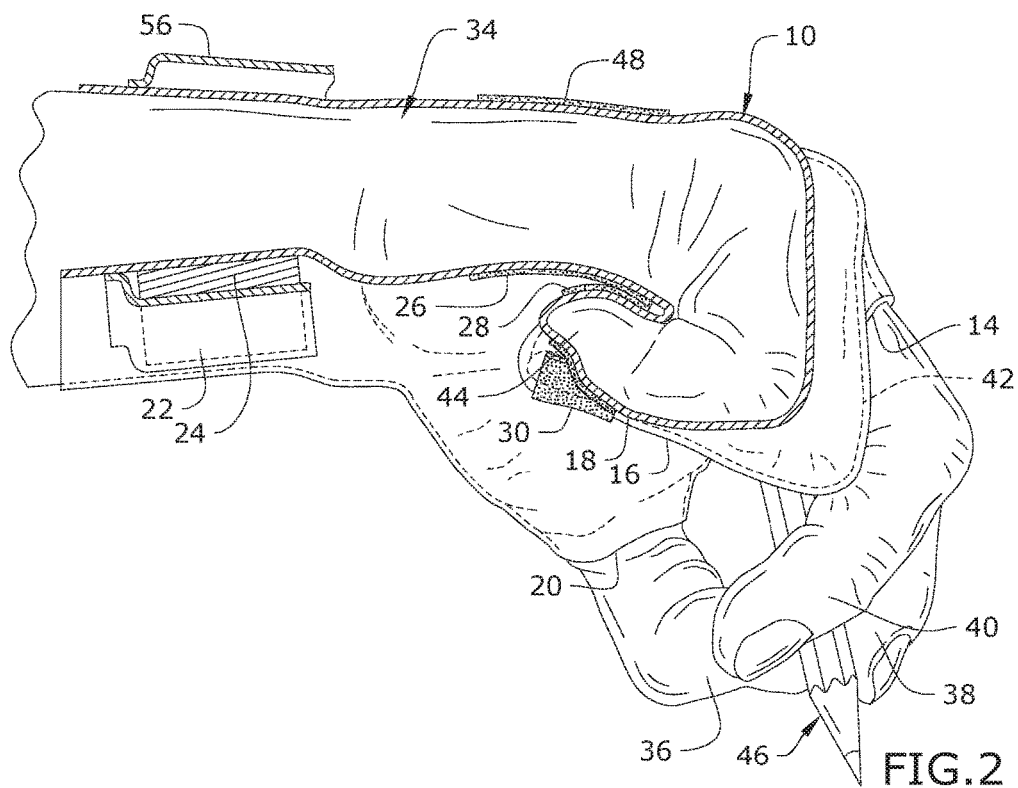

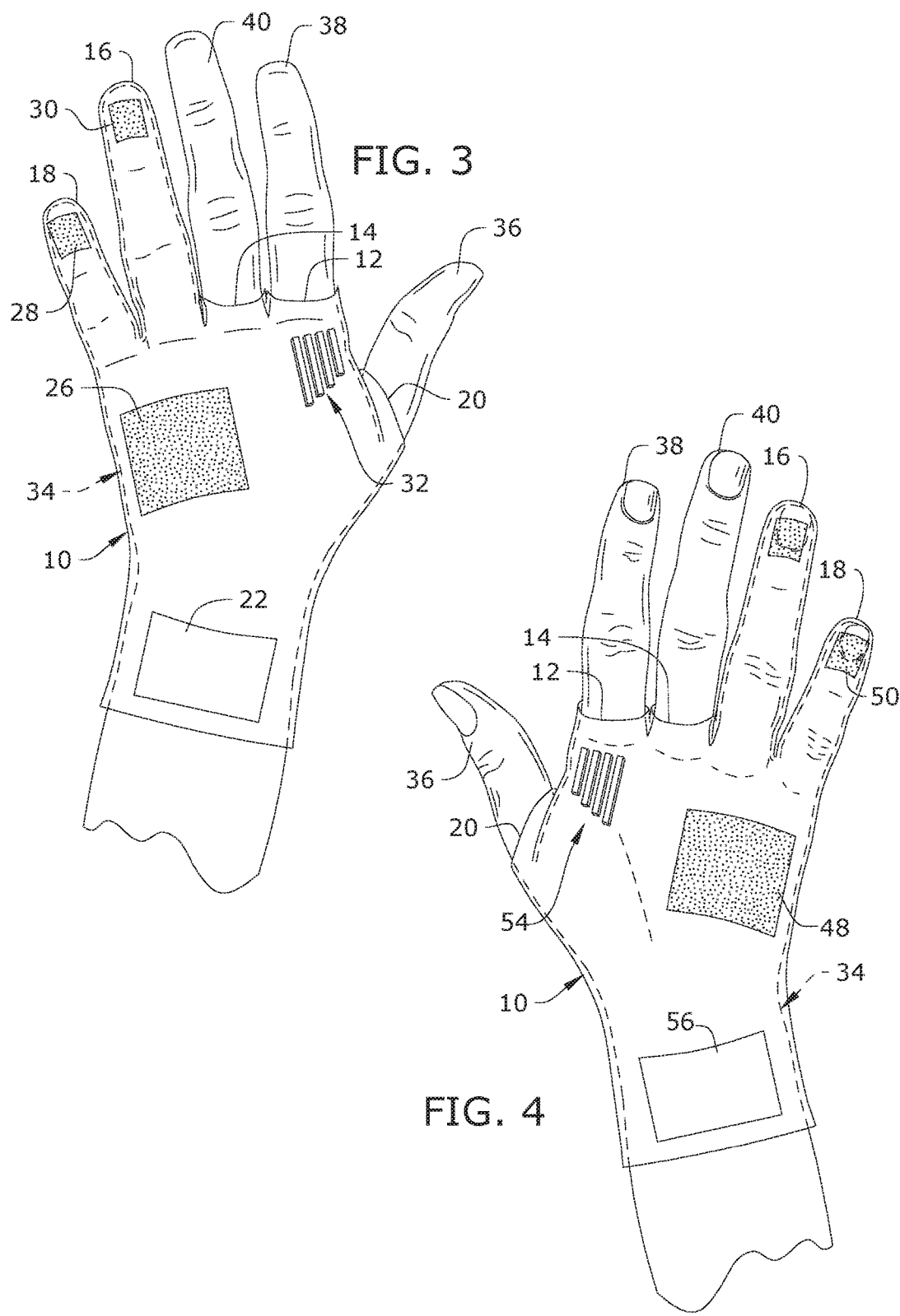

REMEDIAL HANDWRITING GLOVE

BACKGROUND OF THE INVENTION

The present invention relates to penmanship training and, more particularly, to a remedial handwriting glove.

Penmanship is the technique of writing with the hand using a writing instrument. Today, this is most commonly done with a pen or pencil. Handwriting requires the motor coordination of multiple joints in the hand and wrist to form letters and to arrange them on the page. Holding the pen and guiding it across paper depends mostly upon sensory information from skin, joints and muscles of the hand and this adjusts movement to changes in the friction between pen and paper.

The only currently available training aid to teach penmanship is a sock-like device that covers the entire writing hand but does not successfully contain or restrict those fingers unneeded for efficient and legible hand writing.

As can be seen, there is a need for an improved training aid for penmanship.

SUMMARY OF THE INVENTION

In one aspect of the present invention, a remedial handwriting aid comprising: a glove comprising a front, a back, a palm portion, a pinky sleeve extending from the palm portion and a ring finger sleeve extending from the palm portion; a first connector attached to the front at a distal end of the pinky sleeve; a second connector attached to the front at a distal end of the ring finger sleeve; and a third connector attached to the front at the palm portion below the pinky sleeve and the ring finger sleeve, wherein the first connector and the second connector releasably attach to the third connector.

These and other features, aspects and advantages of the present invention will become better understood with reference to the following drawings, description and claims.

BRIEF DESCRIPTION OF THE DRAWINGS

FIG. 1 is a perspective view of an embodiment of the present invention in use;

FIG. 2 is a side detail view of the present invention taken along line 2-2 in FIG. 1;

FIG. 3 is a bottom view of an embodiment of the present invention being worn by a user;

FIG. 4 is a top view of an embodiment of the present invention being worn by a user.

DETAILED DESCRIPTION OF THE INVENTION

Figure 5:
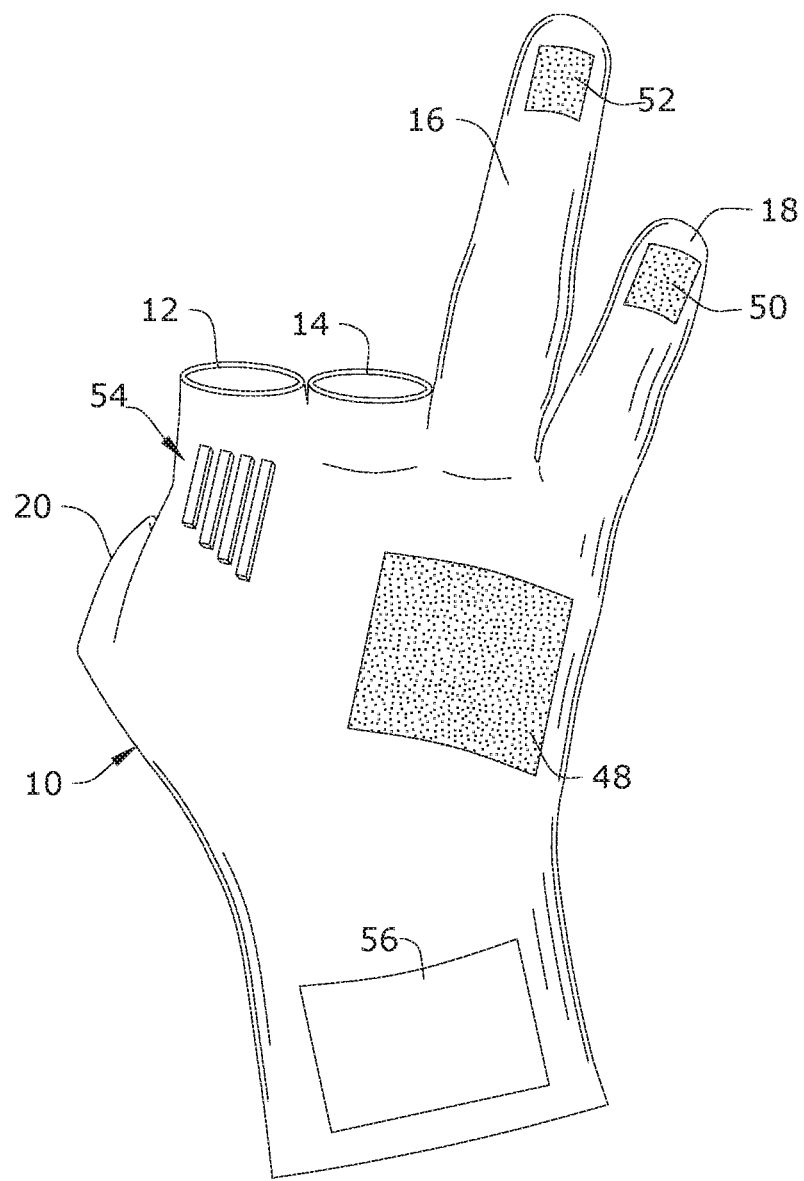
FIG. 5 is a top view of the present invention, the bottom view being a mirror image thereof.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Briefly, the present invention includes a glove-like device that fits over a hand writers hand that comfortably limits the use of fingers that are not required for efficient hand writing and that, when used by an inexperienced hand writer, impedes the process. The device of the present invention also assists a new writer by providing extra grip and allows him or her to hold a normal sized writing instrument.

The glove of the present invention assists new writers with holding a writing instrument properly, and helps prevent the common mistakes new writers make when learning to write by hand.

New writers commonly attempt to grab a writing instrument with too many fingers. The present invention solves the problem by comfortably containing the fingers that should not be used when writing. In addition, the present invention has grips to prevent sliding of the writing instrument.

The present invention may include a customized glove, Velcro® tabs and grips as shown in the drawing. Although the glove may be constructed of any suitable material, the preferred embodiment depicted in the drawing is a thin fleece/microfiber knit material. Choosing a knit material provides for expansion that can fit a variety of hand sizes. The glove and Velcro® tabs are sewn/glued together in certain areas to create the specialized glove. Fabric paint or silicone is applied to specific locations on the glove to provide enhanced grip of the writing instrument.

The glove has three missing fingers (the thumb, pointer and middle finger) to allow for natural grip of the writing instrument. The Velcro® tabs are placed on the remaining fingers of the glove to act as a comfortable control of the non-writing fingers. In doing so, the hand comes together to hold the writing instrument with proper form. The grips on the glove function to provide friction against the writing instrument so that it does not slip out of the hand.

This construction would be repeated on the opposite side of the glove making it capable of accommodating both right and left hands. Thus, the glove is reversible so that it can suit right and left handed writers.

The user would slip the glove on his or her hand and then bend the ring and pinky finger to secure them to the palm. The writer would then have the remaining fingers to grip the writing instrument. The grips on the glove would help to prevent the writing instrument from sliding out of the hand.

Referring to FIGS. 1 through 5, the present invention includes a remedial handwriting aid. The remedial handwriting aid includes a glove 10. The glove includes a first connector 28 attached to a pinky sleeve 18 and second connector 30 attached to a ring finger sleeve 16. A third connector 26 is attached to a palm portion of the glove 10. The first connector 28 and the second connector 30 releasably attach to the third connector 26.

The glove 10 fits over a user's hand 34. The glove 10 may be made of standard materials, such as woven fabrics, leather, thin fleece/microfiber knit material, and the like. The glove 10 includes a front, a back, the palm portion, the pinky sleeve 18 extending from the palm portion and a ring finger sleeve 18 extending from the palm portion. The pinky sleeve 18 is sized to cover a pinky 44 of the user and the ring finger sleeve 18 is sized to cover a ring finger 42 of the user. The glove 10 further includes a thumb finger opening 20, an index finger opening 12 and a middle finger opening 14. A thumb 36 of the user may extend through the thumb finger opening 20, an index finger 38 of the user may extend through the index finger opening 12, and a middle finger 40 of the user may extend through the middle finger opening 14. A wrist portion extends from the palm portion opposite the pinky sleeve 18 and the ring finger sleeve 16.

The first connector 28 of the present invention is attached to the front of the glove 10 at a distal end of the pinky sleeve 18. The second connector 30 of the present invention is attached to the front of the glove 10 at the distal end of the ring finger sleeve 16. The third connector 26 is attached to the front of the glove 10 below the pinky sleeve 18 and the ring finger sleeve 16. The connectors 26, 28, 30 may be any connectors that releasably attach the ends of the pink sleeve 18 and the ring finger sleeve 16 to the palm portion of the glove. For example, the connectors 26, 28, 30 may include hook and look fasteners, snap buttons, clips and the like. As illustrated in the Figures, the first connector 28 and the second connector 30 may be a patch of one of a hook and loop fastener and the third connector 26 may be a patch of the other of the hook and loop fastener.

The present invention may further include a gripping 32 to further stabilize the writing utensil 46. For example, the gripping 32 may be a plurality of rubberized strips attached to the front of the glove 10. The plurality of rubberized strips may be attached adjacent to the thumb opening 20 and the pointer finger opening 12. The writing utensil 46 may rest on the rubberized strips while in use.

The present invention may further include a pocket 22 formed on the front of the glove 10 at the wrist. The pocket 22 may be a sheet having four sides, three of the sides sewn to the glove 10 and one of the sides forming an opening leading into the pocket 22. A weight 24, such as metal block, a container holding sand/water and the like, may be placed within the pocket 22 to add additional weight to the glove 10. The weight 24 may isolate the hand allowing for dynamic movement while writing.

The present invention may be used on the right and left hand. In such embodiments, the back of the glove 10 may include all of the same components as the front. For example, a fourth connector 50 is attached to the back of the glove 10 at a distal end of the pinky sleeve 18. A fifth connector 52 is attached to the back of the glove 10 at the distal end of the ring finger sleeve 16. A sixth connector 48 is attached to the back of the glove 10 below the pinky sleeve 18 and the ring finger sleeve 16. The back of the glove 10 may further include a second gripping 54 and a second pocket 50.

It should be understood, of course, that the foregoing relates to exemplary embodiments of the invention and that modifications may be made without departing from the spirit and scope of the invention as set forth in the following claims.

What is claimed is:

1. A remedial handwriting aid comprising:
a glove comprising a front, a back, a palm portion, a pinky sleeve extending from the palm portion, a ring finger sleeve extending from the palm portion, a thumb finger opening, an index finger opening, and a middle finger opening;
a rubberized gripping attached to the front at the palm portion adjacent the thumb finger opening and the index finger opening;
a first connector attached to the front at a distal end of the pinky sleeve;
a second connector attached to the front at a distal end of the ring finger sleeve; and
a third connector attached to the front at the palm portion below the pinky sleeve and the ring finger sleeve, wherein
the first connector and the second connector releasably attach to the third connector.

2. The remedial handwriting aid of claim 1, further comprising a wrist portion extending from the palm portion opposite the pinky sleeve and the ring finger sleeve.

3. The remedial handwriting aid of claim 2, further comprising a pocket formed on the wrist portion.

4. The remedial handwriting aid of claim 3, further comprising a weight disposed within the pocket.

5. The remedial handwriting aid of claim 1, wherein the first connector and the second connector is one of a hook and loop fastener and the third connector is the other of the hook and loop fastener.

6. The remedial handwriting aid of claim 1, further comprising:
a fourth connector attached to the back at the distal end of the pinky sleeve;
a fifth connector attached to the back at the distal end of the ring finger sleeve; and
a sixth connector attached to the back at the palm portion below the pinky sleeve and the ring finger sleeve, wherein
the fourth connector and the fifth connector releasably attach to the sixth connector.

7. The remedial handwriting aid of claim 6, further comprising a rubberized gripping attached to the back at the palm portion adjacent the thumb finger opening and the index finger opening.

8. The remedial handwriting aid of claim 6, wherein the fourth connector and the fifth connector is one of a hook and loop fastener and the sixth connector is the other of the hook and loop fastener.

9. A remedial handwriting aid comprising:
a glove comprising a front, a back, a palm portion, a pinky sleeve extending from the palm portion and a ring finger sleeve extending from the palm portion;
a wrist portion extending from the palm portion opposite the pinky sleeve and the ring finger sleeve, wherein the wrist portion comprises a pocket;
a first connector attached to the front at a distal end of the pinky sleeve;
a second connector attached to the front at a distal end of the ring finger sleeve; and
a third connector attached to the front at the palm portion below the pinky sleeve and the ring finger sleeve, wherein
the first connector and the second connector releasably attach to the third connector.

10. A remedial handwriting aid comprising:
a glove comprising a front, a back, a palm portion, a pinky sleeve extending from the palm portion, a ring finger sleeve extending from the palm portion, a thumb finger opening, an index finger opening, and a middle finger opening;
a first connector attached to the front at a distal end of the pinky sleeve;
a second connector attached to the front at a distal end of the ring finger sleeve;
a third connector attached to the front at the palm portion below the pinky sleeve and the ring finger sleeve;
a fourth connector attached to the back at the distal end of the pinky sleeve;
a fifth connector attached to the back at the distal end of the ring finger sleeve; and
a sixth connector attached to the back at the palm portion below the pinky sleeve and the ring finger sleeve, wherein
the first connector and the second connector releasably attach to the third connector, and
the fourth connector and the fifth connector releasably attach to the sixth connector.

* * * * *